United States Patent
Rambo et al.

(10) Patent No.: US 11,002,300 B2
(45) Date of Patent: May 11, 2021

(54) FLOW CONDITIONING SYSTEM

(71) Applicant: GENERAL ELECTRIC COMPANY, Schenectady, NY (US)

(72) Inventors: Jeffrey Rambo, Mason, OH (US); Sarah Anne Edwards, Loveland, OH (US); David Perveiler, West Chester, OH (US); Mark David Durbin, Springboro, OH (US); Erich Fitzpatrick, Florence, KY (US)

(73) Assignee: General Electric Company, Schenectady, NY (US)

( * ) Notice: Subject to any disclaimer, the term of this patent is extended or adjusted under 35 U.S.C. 154(b) by 172 days.

(21) Appl. No.: 16/262,283

(22) Filed: Jan. 30, 2019

(65) Prior Publication Data

US 2020/0240447 A1 Jul. 30, 2020

(51) Int. Cl.
  *F15D 1/04* (2006.01)
  *F15D 1/06* (2006.01)
  *F02K 3/04* (2006.01)
  *F16D 1/04* (2006.01)

(52) U.S. Cl.
  CPC ............. *F15D 1/06* (2013.01); *F02K 3/04* (2013.01); *F05D 2220/323* (2013.01); *F05D 2260/606* (2013.01); *F16D 1/04* (2013.01)

(58) Field of Classification Search
  CPC ... F15D 1/02; F15D 1/04; F15D 1/025; G01F 1/40; G01F 15/00; F16L 55/02763
  USPC ................ 138/37, 39, 40, 44; 428/131, 596; 73/198, 861.52, 861.28
  See application file for complete search history.

(56) References Cited

U.S. PATENT DOCUMENTS

| | | | | |
|---|---|---|---|---|
| 3,733,900 A | * | 5/1973 | De Baun | G01F 1/40 73/861.66 |
| 3,964,519 A | * | 6/1976 | De Baun | F15D 1/02 138/37 |
| 4,142,413 A | * | 3/1979 | Bellinga | G01F 15/00 73/198 |
| 4,280,360 A | * | 7/1981 | Kobayashi | G01F 1/3209 73/198 |

(Continued)

FOREIGN PATENT DOCUMENTS

WO  WO2018194457 A1  10/2018

*Primary Examiner* — Patrick F Brinson
(74) *Attorney, Agent, or Firm* — Fitch, Even, Tabin & Flannery LLP

(57) ABSTRACT

A flow conditioning system for a duct. The flow conditioning system includes a preconditioner that modifies upstream fluid flow that is maldistributed, providing predictable downstream flow to fluid flowing within the duct. The directional flow conditioner also includes a stationary flow geometry structure downstream of the preconditioner. The stationary flow geometry structure further conditions the upstream fluid flow from the preconditioner to provide a downstream flow with a substantially uniform flow profile. The flow conditioning system transforms upstream fluids having a maldistributed flow profile such as may be caused by a component, structure or obstruction within the duct to a substantially uniform flow profile downstream of the flow conditioning system within the available axial duct length so that the fluid may interact efficiently with equipment such as heat exchangers positioned within the duct downstream of the flow conditioning system.

20 Claims, 7 Drawing Sheets

(56) References Cited

U.S. PATENT DOCUMENTS

| | | | | |
|---|---|---|---|---|
| 5,201,919 | A * | 4/1993 | Jahn | B01D 47/06 |
| | | | | 96/262 |
| 5,495,872 | A * | 3/1996 | Gallagher | F15D 1/025 |
| | | | | 138/40 |
| 7,234,914 | B2 | 6/2007 | Usab, Jr. et al. | |
| 8,307,943 | B2 | 11/2012 | Klasing et al. | |
| 8,511,096 | B1 * | 8/2013 | Haugen | F02C 7/24 |
| | | | | 60/785 |
| 8,578,719 | B2 | 11/2013 | Kirby | |
| 9,175,577 | B2 | 11/2015 | Papamoschou et al. | |
| 9,205,927 | B2 | 12/2015 | Shepard et al. | |
| 9,605,561 | B2 | 3/2017 | Smith et al. | |
| 2008/0246277 | A1 * | 10/2008 | Gallagher | F16L 39/00 |
| | | | | 285/148.13 |
| 2016/0084165 | A1 | 3/2016 | Packard et al. | |
| 2017/0136853 | A1 | 5/2017 | Garey et al. | |
| 2017/0145959 | A1 | 5/2017 | Baralon | |

* cited by examiner

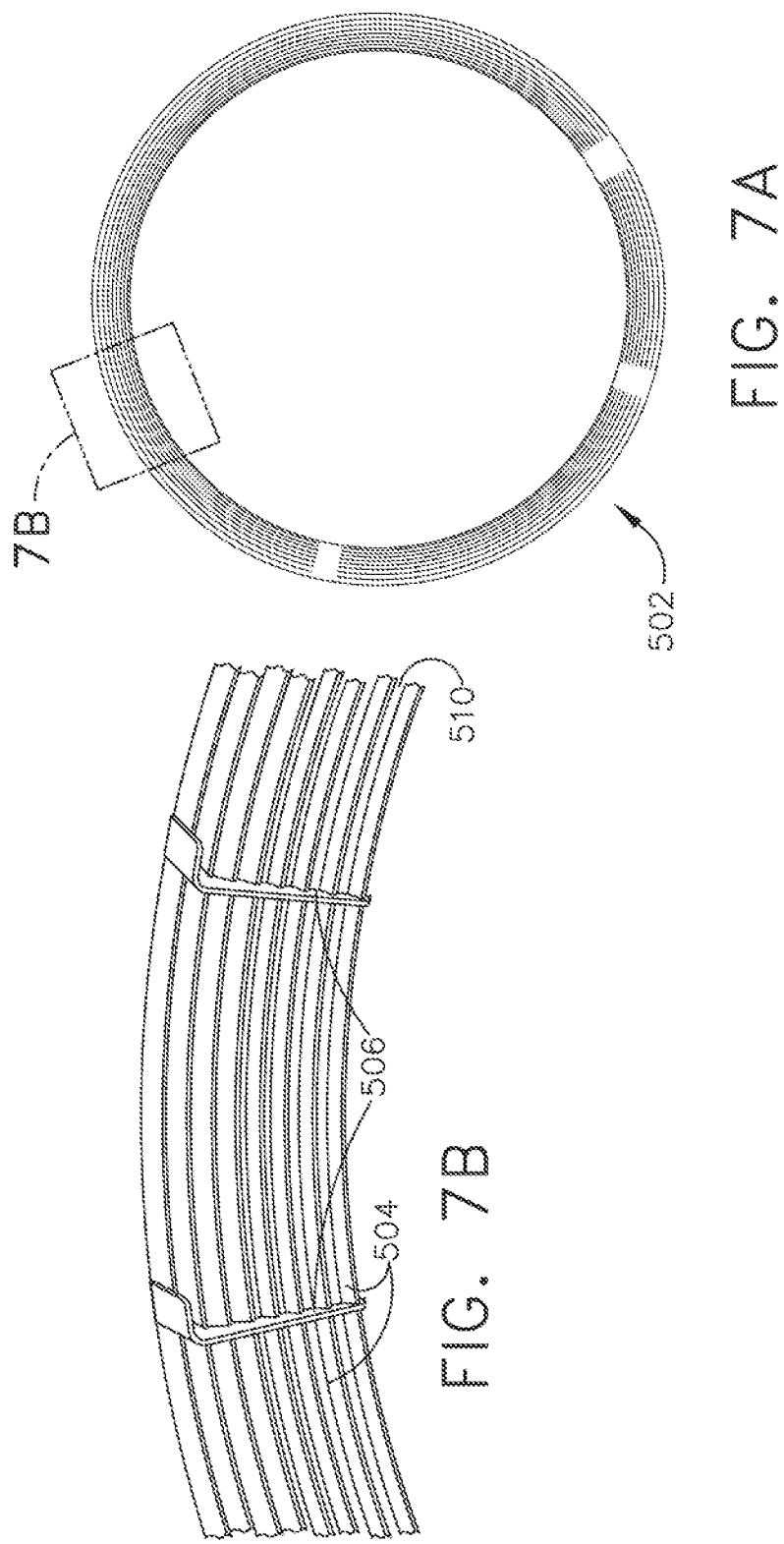

FLOW CONDITIONING SYSTEM

FEDERALLY SPONSORED RESEARCH

This invention was made with government support. The U.S. government may have certain rights in the invention.

FIELD OF THE INVENTION

This invention relates generally to a correcting maldistributed flow distribution in passages or ducts in the radial direction, and more specifically to initially conditioning fluid flow in various ducts having variable inlet profiles in a gas turbine engine to remove variability in the fluid flow field.

BACKGROUND OF THE INVENTION

Gas turbine engines, including but not limited to aircraft engines, operate by burning fuel and extracting energy from the combusted fuel to generate power. Atmospheric air is drawn into the engine from the environment. In a bypass aircraft engine, air is drawn into an engine nacelle by a fan. The air drawn into the duct is then split into core airflow and bypass airflow, the core airflow portion being directed into the engine core passing to the compressor portion of the engine where it is compressed in multiple stages to significantly higher pressure and higher temperature, while the bypass airflow portion is directed into a bypass duct, an annular passage that allows the portion of the air to bypass the engine core.

In the engine core, a portion of the compressed air is then mixed with fuel and ignited in the combustor to produce high energy combustion gases. The high energy combustion gases then flow through the turbine section of the engine, which includes a plurality of turbine stages, each stage comprising turbine vanes and turbine blades mounted on a rotor. The high energy combustion gases create a harsh environment, causing oxidation, erosion and corrosion of downstream hardware. The turbine blades extract energy from the high energy combustion gases and turn the turbine shaft on which the rotor is mounted. The shaft may produce mechanical power or may directly generate electricity. A portion of the compressed air is also used to cool components of the turbine engine downstream of the compressor, such as combustor components. The hot gases passing through the turbine section enter the exhaust section and are exhausted through the exhaust nozzle, providing thrust to propel an aircraft in aircraft applications. In high performance aircraft engines the exhaust section may include an augmentor, also referred to as an afterburner, which burns fuel as needed to provide additional thrust on-demand for the aircraft.

The bypass duct in bypass turbine engines may include static structures and movable components. These static structures and components may include heat exchangers, service lines for the aircraft, structural supports for engine attachments and fixed scoops for removing or introducing air flow to the bypass duct. Moveable components may include actuated doors or moveable scoops for modulating air flow to the bypass duct. All of these structures and components can affect the velocity profile of fluid flowing within the duct, resulting in an undesirable non-uniform velocity profile In high performance aircraft engines, some of the bypass air may be diverted to the exhaust system to support augmentor combustion. Air not diverted for cooling and added to hot gases of combustion in the engine exhaust will exit the bypass nozzle contributing to thrust of the aircraft.

Fluid, such as air entering a passageway such as an engine nacelle, or hot gases of combustion entering a passageway such as an exhaust duct, may be introduced into the duct with variations in flow, that is, air flow having irregular or maldistributed velocity along a cross section of the component. As used herein, "maldistribution" or "maldistributed" refers to a flow having relatively large deviations from uniform velocity or pressure field. Further contributing to this irregular or maldistributed flow through the duct are structures within the passageway such as heat exchangers, air flow scoops, service lines, struts, support brackets and other structural supports, as well as other variable geometry features that might further alter the velocity of fluid flowing in the duct.

This maldistributed flow in the duct is undesirable, in that it can result in inefficiencies in flow in the duct. For example, a heat exchanger within a duct is generally more efficient when the inlet flow has a substantially uniform flow profile with a substantially uniform velocity across the duct cross section.

What is desired is a flow conditioner that reduces maldistributed flow conditions while providing a substantially uniform velocity profile within an existing axial length of a duct. The flow conditioner ideally modifies flow conditions in a duct to remove substantial differences in velocity profiles of the fluid within the existing axial length of the duct, while minimizing pressure losses, reducing losses in energy due to maldistributed flow conditions.

BRIEF DESCRIPTION OF THE INVENTION

A flow conditioning system extending at least partially across a duct directionally conditions the flow of fluid, such as gas, within the duct. The flow conditioning system may be utilized in ducts for flow lengths that are at least an order of magnitude shorter than conventional flow conditioners. The flow conditioning system includes a preconditioner having a flow deflecting feature which directs the entire flow in the duct toward a preselected portion of the duct, increasing gas pressure and reducing gas velocity, in order to counter any non-uniformity introduced into the flow by any structures which may be present in the duct. A predetermined flow profile can then by developed by a structure of stationary flow geometry downstream of the preconditioner that restores homogeneity to the flow profile in the radial direction with incurred pressure drop.

The stationary flow geometry structure comprises a static mixer extending at least partially across the duct creating a passageway for the passage of fluid within the duct or a plurality of passageways for the passage of fluid within the duct. The stationary flow geometry structure may be a diffuser. At least a portion of the fluid passes through the stationary flow geometry structure as it traverses the duct from its fore end to its aft end.

The flow conditioning system directionally conditions the flow of the fluid in a duct, removing at least some of the maldistributed flow resulting from variations and irregularities introduced upstream of the flow conditioning system. That flow may be maldistributed within the duct by upstream structures within the duct, and the specific location of the maldistributed flow depends on the upstream structures and their location. By design of the geometry of the passageways and walls of the stationary flow geometry structure, the flow conditioning system also provides predetermined and specific exit profiles for the fluid as it traverses downstream of the flow conditioning system, removing maldistributed flow while achieving a more uniform flow profile with minimal pressure drop in the shortest axial distance possible.

The flow conditioning system may have any shape, but the stationary flow geometry flow structure of the flow conditioning system positioned downstream of the preconditioner provides a smooth flow path for gases flowing in the duct, such as a leading edge with a small radius, is independently positioned and independently shaped as a function of each flow passage based on a predetermined inlet profile and duct geometry to optimize the uniformity of the discharge profile in the available axial distance in the duct.

The maldistributed fluid flow in the duct is initially channeled by the preconditioner of the flow conditioning system into at least one passageway, the passageway opening being smaller than the duct opening. The velocity of the fluid channeled into the passageway by the preconditioner is increased while its pressure is decreased. The preconditioner contracts the flow by channeling it, removing some of the variability in the fluid velocity while providing more uniformity. The fluid entering the stationary flow geometry structure is less maldistributed. Upon exiting the stationary flow geometry structure, the fluid has a more uniform flow velocity, with the maldistributed flow having been removed. When the area at the exit of the stationary flow geometry structure increases, the velocity of the fluid decreases and the pressure increases, as in standard venturi flow. But placement of the preconditioners near or adjacent to the entry to the duct and aft of downstream structures contributing to maldistributed flow reduces pressure losses from the inlet of the flow conditioning system to the outlet of the flow conditioning system due to velocity fluctuations, such as experienced in prior art ducting not equipped with this feature, as prior art flow conditioners require either longer axial flow lengths or provide unacceptably high pressure drops in the available axial flow lengths than the directional flow conditioning system of the present invention.

An advantage of the flow conditioning system of the present invention is that it reduces the effect of variable upstream geometry on flow so as to minimally impact downstream components while enabling a fixed geometry mixer within the duct.

An advantage of the flow conditioning system of the present invention is that it provides a predetermined exit profile with minimal space requirements and low pressure loss.

When used upstream of a heat exchanger, the flow conditioning system improves the effectiveness and efficiency of the heat exchanger by providing a more uniform velocity provide across the flight envelope while minimizing space needs, requiring flow lengths an order of magnitude shorter than prior art flow conditioners.

A further advantage of the flow conditioning system of the present invention is that it may be used as a replacement for a deswirling vane in certain ducts.

Still a further advantage of the flow conditioning system of the present invention is that it can be used in any duct or passageway that requires robustness to inlet conditions, has limited mixing space, requires a low pressure loss and requires a predetermined, specific exit profile.

Another advantage of the flow conditioning system of the present invention is that it may be used in any duct. The duct walls may be circular, parallel or non-parallel and the duct flow area may be non-constant along its axial flow length, allowing it to be utilized in any arbitrarily shaped duct. This makes the present invention particularly useful in aerospace propulsion applications where it is desirable to reduce diffusion lengths within existing duct lengths.

Yet another advantage of the flow conditioning system of the present invention is that it may be used to split the flow exiting the stationary flow geometry structure in a preselected flow pattern even as the split flow has maldistributed flow removed. Thus, more of the fluid may be directed at one portion of the duct, for example outboard, than toward an inboard portion of the duct, Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIGS. 7(a) and 7(b) depict an exemplary geometry of a flow conditioner of the present invention. FIG. 7(a) depicts a forward looking aft view of the flow conditioner. FIG. 7(b) depicts an isometric view of a portion of the flow conditioner of FIG. 7(a).

DETAILED DESCRIPTION OF THE INVENTION

Figure 1:
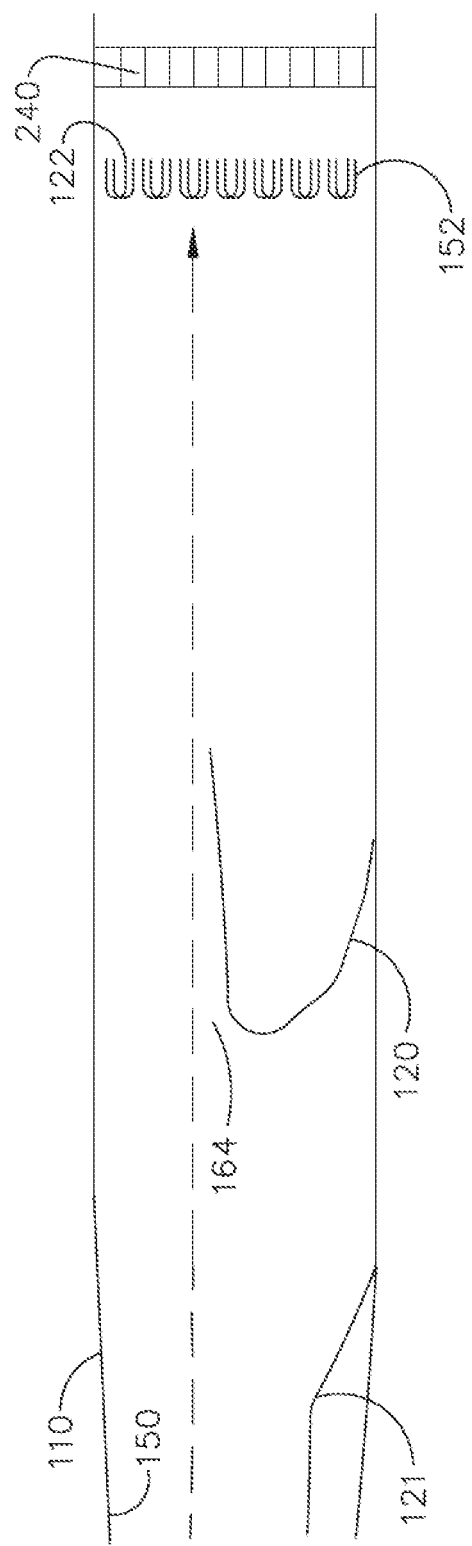
FIG. 1 is a first embodiment of a directional flow conditioner of the present invention utilizing a preconditioner and a stationary flow geometry structure and depicting a door in the closed position upstream and a device such as a heat exchanger or honeycomb structure in a straight duct downstream of the directional flow conditioning system.

Flow conditioners are used in ducts to condition the flow of fluid. In gas turbine engines, well known flow conditioners used to modify airflow include stator vanes which are a row of small airfoils attached to the casing of an axial-flow turbine, positioned between the rotors in the compressor or turbine section of a gas turbine engine to impart a predetermined swirl to the fluid flow so that it enters the compressor or turbine to allow the compressor or turbine to operate with maximum efficiency while avoiding undesirable conditions such as stall or surge. While these stator vanes can be stationary, they often can be rotatable in order to better match inlet conditions to the compressor or turbine operation for maximum efficiency. These stator vanes are not necessarily used to straighten flow, but rather used to impart a predetermined amount of swirl to the inlet fluid. Other flow conditioners that are used to remove irregularities in fluid flow in a duct include constrictions in the duct utilizing the venturi effect. These flow conditioners typically require a substantial length of duct to operate, making them impractical where only short duct sections are available for removing irregular fluid flow profiles. As a result, in many ducts, there can be substantial pressure loss from the inlet to the outlet due to irregular fluid flow profiles, reducing the efficiency of fluid flow through the duct as well as to any auxiliary equipment in the duct that depends on efficient, uniform fluid flow profiles.

The present invention provides a directional flow conditioning system within a duct that removes a maldistributed fluid flow profile within a minimal axial duct length. As used herein, fluid flow profile, or simply flow profile, refers to a velocity profile of fluid flowing within the duct. A maldistributed flow, irregular flow or maldistributed flow profile refers to a flow profile having a substantially non-uniform distribution of fluid velocity across a duct cross section, while a uniform flow profile refers to a substantially uniform distribution of fluid velocity across a duct cross section. The present invention conditions the flow through a duct to remove maldistributed flow to provide a uniform flow profile in shorter flow lengths than prior art flow conditioners and in which prior art flow conditioners are not practical. The directional flow conditioning system of the present invention finds use in any duct in which fluid flows and in which structures within the duct contribute to a maldistributed flow profile, undesirably reducing efficiency of the fluid, and wherein the duct lacks the requisite duct length to restore a uniform flow profile using conventional flow conditioners.

As used herein, fluid may refer to a gas or a liquid. When fluid is used with reference to a gas turbine engine, including an aircraft engine, fluid may refer to air inlet into the front of the engine through the nacelle forward of the engine fan, which may then be split into bypass air or compressor air. Fluid may also refer to the hot gases of combustion passing from the combustor section of the engine into the turbine section of the engine and rearward through the exhaust to propel the vehicle to which the engine is affixed. As used herein, a duct includes any enclosed structure in which fluid flows from an inlet end to an outlet end. As used herein, an upstream structure or component within a duct may be any impediment or blockage affecting fluid flow in the duct upstream of the directional flow conditioning system that imparts a maldistributed flow profile to the fluid in the duct. Exemplary upstream structures or movable components include struts, doors, support brackets, and other hardware extending into a duct, turbine and fan frames in a gas turbine as well as an augmentor and augmentor support hardware extending into an exhaust duct of an aircraft engine. As used herein, a fore end of a duct is the end closest to its inlet end and an aft end is the end closest to the outlet end. When used with reference to a duct in an aircraft turbine engine, the fore end of a duct is positioned with respect to the inlet end or fan end of the engine, while the aft end of a duct is positioned with respect to the exhaust end of the engine, so as to be consistent with aircraft turbine engine nomenclature. Such an interpretation of fore end and aft end is consistent with both usages.

The flow conditioning system of the present invention conditions the flow profile of the fluid in a duct in an axial direction, removing variations that exist in the flow profile upstream of the flow conditioning system. The flow conditioning system thus may be used to condition the flow of fluid that is disturbed by various components and structures or blockages in the duct creating a maldistributed flow profile, thereby dictating placement of a directional flow conditioner to correct the maldistributed flow profile. Fluid flow also may enter a duct with an irregular flow profile, which may be further exacerbated by the structures within the duct. For example, in an aircraft engine, air entering the nacelle at the fore end of the engine generally has an irregular flow profile, and a flow conditioning system may desirably remove some of the maldistributed flow profile prior to this inlet air reaching the fan. Gases flowing in a duct, such as, for example, in the bypass duct or in the exhaust duct also may experience a maldistributed flow profile as a result of curvature of the duct or, for example, support structures or equipment within the duct. The directional flow conditioning system can be placed downstream of these features so that fluids experiencing a maldistributed flow profile due to interaction with these features can be inlet into the flow conditioning system so that the maldistributed flow profile can be corrected and a substantially uniform flow profile can be restored. For duct curvatures, the directional flow conditioning system may be placed upstream of the curvatures so that the fluid entering the curvature is directed into the curvature at an angle that provides a substantially uniform flow profile. Alternatively, the directional flow conditioning system may be placed downstream of the curvature to correct any maldistributed flow profile introduced by the fluid interacting with the duct boundaries at the curvature.

A flow conditioning system extending at least partially across a duct directionally conditions the flow of fluid, such as gas, within the duct. A first upstream preconditioner modifies the flow by contracting it to provide a predictable downstream flow profile to fluid exiting the preconditioner. The preconditioner is positioned based on the presence and location of an upstream feature that contributes to maldistributed flow. Fluid exiting the preconditioner is conditioned to have a predictable downstream flow profile, typically a higher velocity but with an increased pressure drop. A stationary flow geometry structure is positioned downstream of the preconditioner and further modifies the flow profile so that fluid exiting the stationary flow geometry structure has a substantially uniform flow profile with a predetermined velocity, pressure and, when desired, direction. Fluid entering the stationary flow geometry structure will experience a decrease in pressure but an increase in velocity. On exiting a properly designed stationary flow geometry structure, the fluid will experience an increase in pressure but a decrease in velocity, both being predetermined. Importantly, the fluid flow profile of the fluid exiting the stationary flow geometry structure will have a substantially uniform velocity across the cross section downstream of the stationary flow geometry structure. The flow conditioning system of the present invention is utilized in ducts for flow lengths in the duct and provide flow conditioning over a length that is at least an order of magnitude shorter than conventional flow conditioners. This enables the directional flow conditioning system of the present invention to be positioned in ducts having flow lengths that cannot otherwise accommodate conventional flow conditioners.

Referring now to FIG. 1, which is a first embodiment of the directional flow conditioner of the present invention, a first duct 110 has a fore end 150 and an aft end. Duct 110 is a straight duct, but need not be so limited. Intermediate the fore end and the aft end, first duct 110 also includes a door 121 movable from a first closed position to a second open position. At the aft end, and downstream of stationary geometry structure 122 is structure 240 in the duct flow path, which may be, for example, a heat exchanger or a honeycomb structure. In FIG. 1, door 121 is depicted in its closed position. As will be understood by those skilled in the art, when the door 121 is open, the fluid flow is further disrupted, as fluid is diverted out of duct 110 by door 121. The flow conditioning system of the present invention includes a preconditioner and a stationary geometry structure downstream of door 121 but upstream of the aft end of duct 110. Preconditioner, a fairing 120 in FIG. 1, is positioned downstream of door 121. Fairing 120, which is fixed in position within duct 110, diverts fluid flowing in the duct toward the portion of the duct opposite door 121, regardless of the position of door 121, contracting the fluid stream. This fairing 120 guides the bulk flow opposite the position of the door 121 in the duct so that fluid passing through fairing 120 is conditioned to behave in a manner that is more predicable, and importantly, not dependent on the position of door, even if its flow profile is not uniform on exiting preconditioner 120. As fairing 120 directs the fluid flow into a more restricted channel, it increases its velocity while its pressure is decreased. This change in flow by fairing 120 results beneficially in a flow that is more uniform. Stationary flow geometry structure 122 is positioned downstream of preconditioner, fairing 120. Fluid flow exiting fairing 120 may not have a uniform velocity or direction, but always exits the fairing in a predictable manner. Thus, preconditioner, fairing 120, directs the bulk fluid flow to impact the stationary flow geometry structure 122 in a predicable manner, allowing stationary flow geometry structure 122 to further condition flow passing through it so that it exits with a substantially uniform flow profile. By the time fluid flow exits stationary flow geometry structure 122, the maldistributed flow profile has been corrected.

It will be understood by those skilled in the art that although the preconditioner of FIG. 1 is depicted as fairing, it may have any shape that provides fluid exiting from it with a predictable downstream flow exiting passageway 164, even if the downstream flow profile is not substantially uniform. It will be further understood that the directional flow conditioning system of FIG. 1 comprising preconditioner 120 and stationary flow geometry structure 122 provides fluid exiting from the flow conditioning system with a substantially uniform profile for a duct in which flow may be maldistributed due to the position of a structure or component such as door 120. This flow conditioning system may be used to counter maldistributed flow profiles due solely to duct curvature, the presence of a door, regardless of its position or the presence of support structures, or any combination of these features.

In the embodiment shown in FIG. 1, the preconditioner 120 is shown as a fairing extending into duct 110. However, preconditioner 120 may have any shape that provides predictable downstream flow upon exiting the preconditioner and before entering stationary flow geometry structure 122. For example, preconditioner 120 may comprise a venturi. Stationary flow geometry structure 122 is depicted in FIG. 1 as a plurality of venturis extending into the duct act of preconditioner 120. However, stationary flow geometry structure 122 is not so limited and may be any structure that provides a substantially uniform flow profile to fluid exiting on its downstream side, preferably with minimal pressure loss.

Fluid on the downstream side of stationary flow geometry structure 122 will have a substantially uniform flow profile so that air entering a component in the duct downstream of stationary flow geometry structure 122 of the flow conditioner, for example a heat exchanger, is "clean" or at least "cleaner", that is to say, the maldistributed flow profile will have been removed from the fluid so that a more uniform fluid flow enters the downstream component, such as the heat exchanger. Efficiencies of components such as heat exchangers improve because once the maldistributed flow profile is removed, providing a more uniform flow profile leads to better performance. For example, in a heat exchanger, substantially uniform velocity flow as occurs with a uniform flow profile into the heat exchanger can improve efficiency of the heat exchanger up to 90% as compared to an efficiency of 60% with a maldistributed flow profile. It can be appreciated that removing at least some if not all maldistributed fluid flow can improve efficiencies of such components. Furthermore, the present invention provides a simple solution to providing fluid flow profile conditioning for the elimination of maldistributed fluid flow in any duct, and in particular in any duct lacking sufficient length that make other solutions to correcting the flow profile ineffective.

Figure 2:
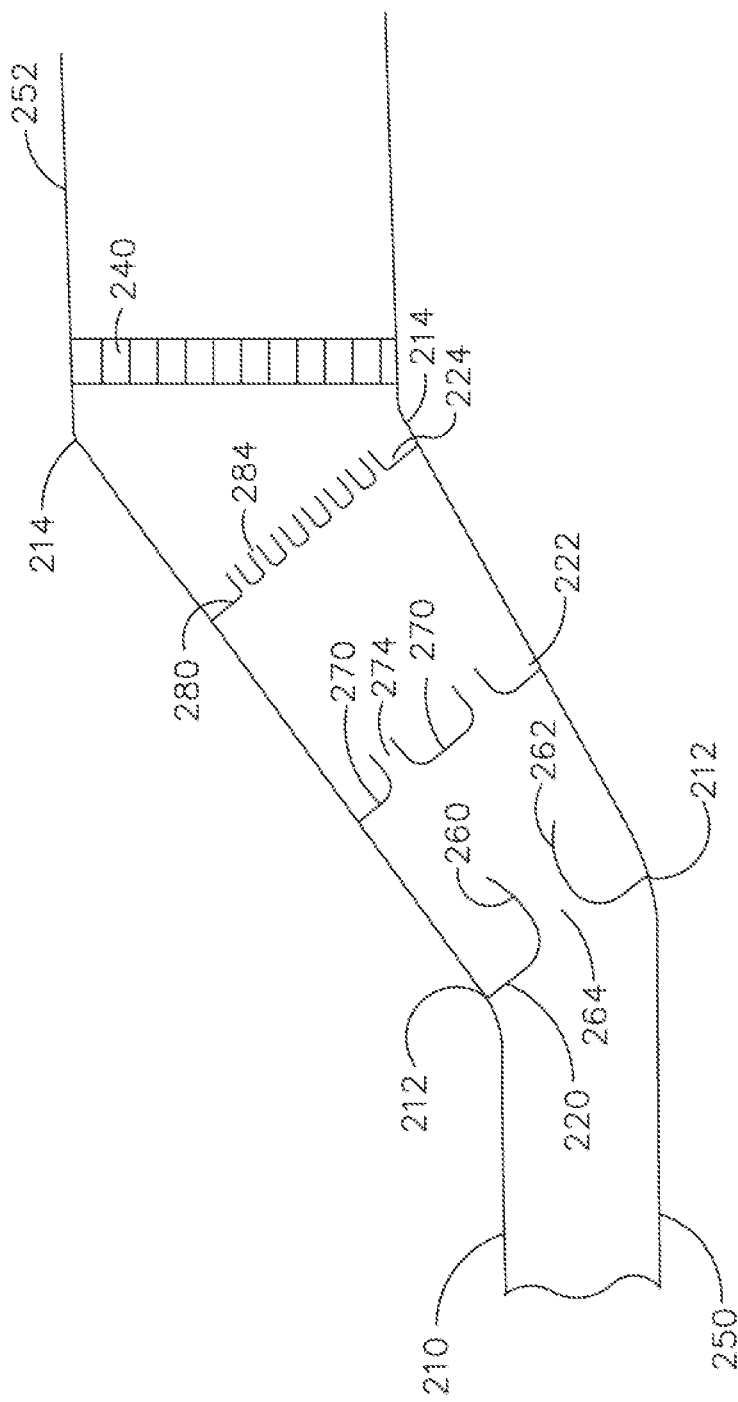
FIG. 2 is a second embodiment of a directional flow conditioning system of the present invention utilizing a plurality of preconditioners upstream of the stationary flow geometry structure to condition inlet flow to a device such as a heat exchanger or honeycomb structure positioned in an arcuate duct downstream of the flow conditioning system.

In another variation of this embodiment, a duct may experience maldistributed flow due to curvature in the duct, as depicted in FIG. 2. In this embodiment, a maldistributed flow profile in flow through duct 210 results from first duct curvature 212 and second duct curvature 214. FIG. 2 illustrates different methods of handling curvature to overcome maldistributed flow. The cross sectional area of the duct fore of first curvature 212 and aft of passageway 264 can be the same, in which case, full venturi flow will not be experienced. However, in FIG. 2, the duct cross section does increase fore (upstream) to aft (downstream) as occurs in a diffuser. Nevertheless, passageway 264 of first preconditioner 220 as well as passageway 274 of second preconditioner 222 provides predictable downstream flow to fluid exiting passageways.

Referring again to FIG. 2, which embodiment utilizes a plurality of preconditioners and a stationary flow geometry structure to condition inlet flow to a device positioned in a second duct 210. Second duct 210 includes a first curvature 212 at a fore end 250, and a second curvature 214 at an aft end 252. In addition to the curvature, duct 210 may also include a structural feature or a door upstream or fore of a preconditioner. First preconditioner 220 in second duct 210 is depicted as a venturi having two walls 260, 262 extending into the flow of duct 210. In this embodiment, first wall 260 and second wall 262 are identical in cross section. In three dimensions, first wall 260 and second wall 262 may comprise a pipe of a diameter or cross section less than the diameter or cross section of duct 210, having a flared fore end extending over to and attached to the inside diameter of duct 210. First wall 260 and second wall 262 extend for the same distance aft of first curvature 212 in duct 210. First wall 260 and second wall 262 form a passageway 264.

Fluid flowing in duct 210 may experience maldistributed flow resulting from the effect of first duct curvature 212. Fluid flowing in duct 210 entering passageway 264 will experience a pressure decrease and a velocity increase, the passageway of preconditioner 220 acting to provide a predictable downstream flow to exiting fluid.

Figure 3:
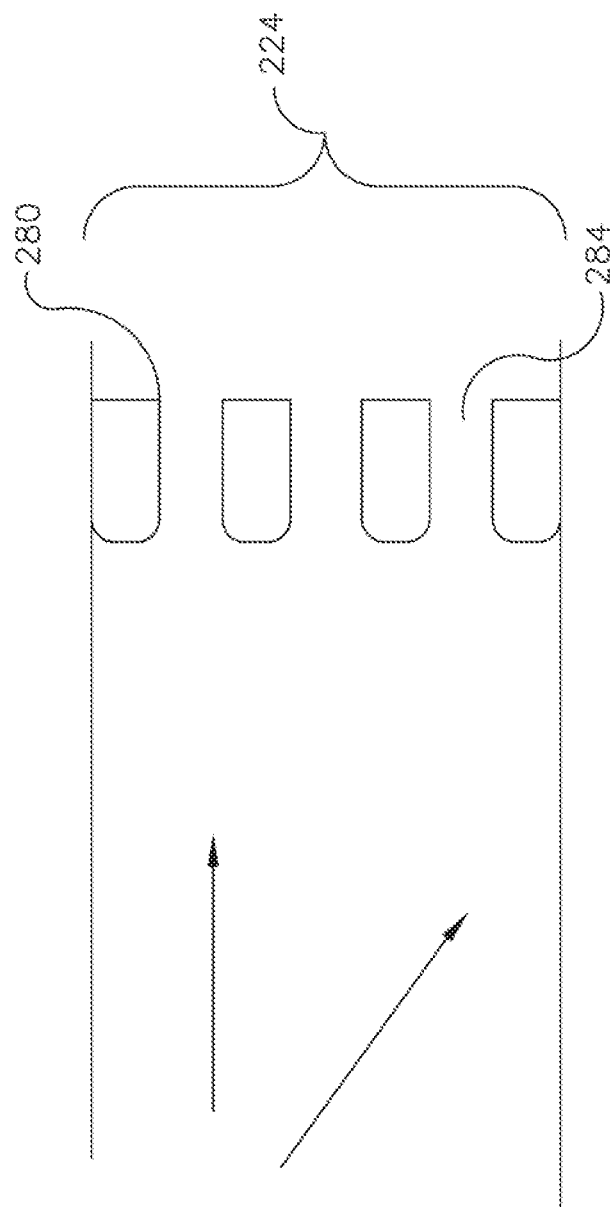
FIG. 3 depicts possible angles of airflow in a duct after exiting the preconditioner and fore of a stationary flow geometry structure of the flow conditioning system of the present invention.

In the example shown in FIG. 2, a second preconditioner 222 is shown extending across duct 210 aft or downstream of first preconditioner 220. Additional preconditioners may be required when the flow profile is insufficiently predictable before entry into a stationary flow geometry structure. Second preconditioner 222 in FIG. 2 also is depicted as a venturi comprising a first plurality of walls 270 projecting from and attached to duct 210 extending a predetermined distance into duct 210. First plurality of walls 270 of second preconditioner forms a first plurality of passageways 274 through which fluid flow is channeled. Two passageways are shown in FIG. 3 but second preconditioner 222 is not so limited and may have more passageways or may have a shape other than a venturi. Preconditioners remove at least some of the maldistributed flow profile from upstream fluid flow so that the downstream flow profile is more uniform. Fluid flowing in duct 210 entering first plurality of passageways 274 of second preconditioner 222 will experience a pressure decrease and a velocity increase, the passageways 274 acting to provide additional predictable downstream flow behavior for the fluid flowing aft of first preconditioner 220. For second preconditioner 222, depicted as venturis in FIG. 2 additional irregular flow behavior is removed from fluid flowing into and through them, as previously discussed.

A stationary flow geometry structure 224 is shown extending across duct 210 aft of second preconditioner 222. Stationary flow geometry structure 224 comprises a plurality of walls 280 projecting from and attached to duct 210 extending a predetermined distance into duct 210. Plurality of walls 280 of stationary flow geometry structure 224 form a plurality of passageways 284 for stationary flow geometry structure 224. In FIG. 2, stationary flow geometry structure 224 is depicted as venturis. Additional preconditioners may be required when the fluid flow profile does not exhibit sufficiently uniform flow distribution after exit from a second preconditioner 222 and before entry into a stationary flow geometry structure 224. Stationary flow geometry structure 224 is not limited to venturis and may assume any other shape that provides flow not only with a uniform flow profile, but also directed in a predetermined direction. Stationary flow geometry structure 224 acts in a similar manner to first and second preconditioners 220, 224, but the downstream flow exiting stationary flow geometry structure 224 has a sufficiently uniform flow profile for entry into a downstream component 240 such as a heat exchanger or honeycomb structure. Fluid flowing in duct 210 entering first plurality of passageways 284 of stationary flow geometry structure 224 will experience a pressure decrease and a velocity increase, the passageways 284 acting to deliver fluid downstream with a substantially uniform flow profile. Passageways can also be shaped or oriented to deliver the fluid downstream in a preselected direction so that preselected amounts of fluid can be delivered to predetermined portions of downstream component 240. In FIG. 2, plurality of passageways are oriented so that downstream fluid flow substantially avoids contact with second duct curvature 214 and is delivered to downstream component 240 without having a maldistributed flow profile due to second curvature 214. Each of the plurality of passageways 284 of stationary flow geometry structure deliver fluid flowing into and through them with a uniform flow profile in a predetermined direction to downstream, component 240 as previously discussed.

It should be noted in FIG. 2 that each of the walls of the preconditioners 220, 222 is configured so that each of their passageways is perpendicular (90°) to fluid flowing in the duct. The invention is not so limited as the walls of any of the preconditioners also may be oriented from 60-90° to fluid flow to deliver fluid downstream in a predetermined direction.

Figure 4:
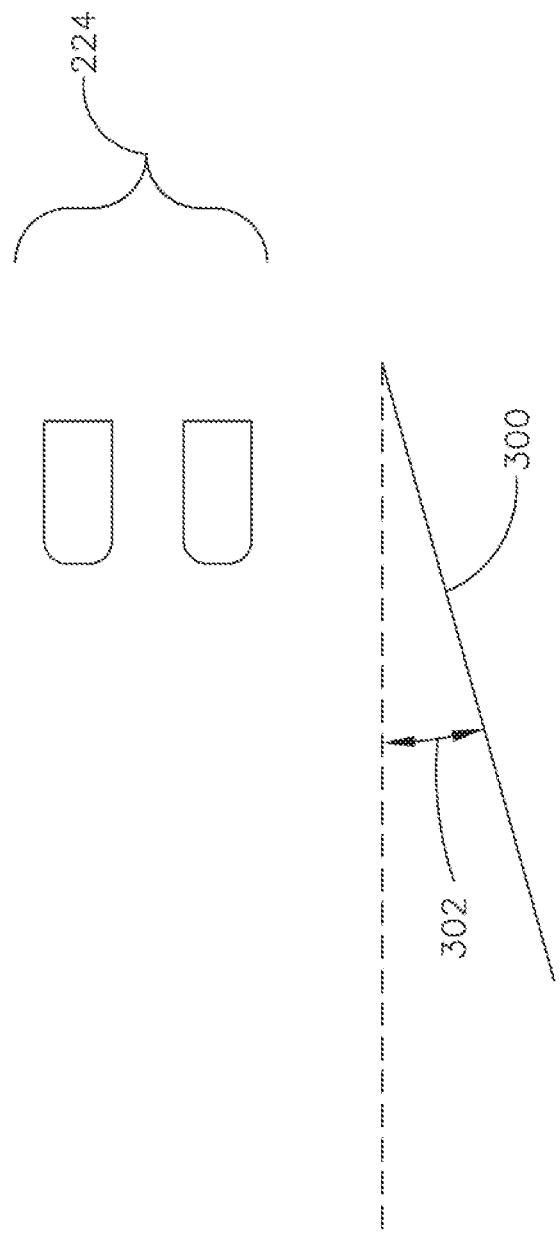
FIG. 4 depicts various exemplary geometries of the stationary flow geometry structure interface of a flow conditioning system of the present invention.

Airflow in a duct approaching a preconditioner, such as for example preconditioner 220 or stationary flow geometry structure 244, may not approach orthogonally. As FIG. 3 illustrates, airflow in a duct fore of stationary flow geometry structure 224 having a plurality of walls 280 may approach passageways 284 in one or more unpredictable directions, which is a characteristic of a maldistributed flow profile, as fluid flow that is not orthogonal to the structure has two components, one parallel to the duct flow and one perpendicular to the duct flow. Of course, the shape of the ducts also may direct the fluid flow toward a flow conditioner at various angles, also contributing to a maldistributed flow profile. FIG. 4 illustrates an exemplary duct wall 300 in a duct that is not straight arranged at an angle 302 in relation to a flow conditioner having a stationary flow geometry structure 224 as depicted in FIG. 2.

Figure 5:
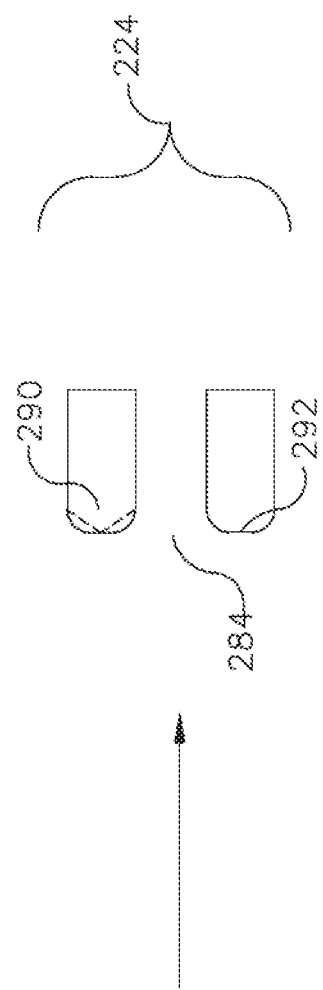
FIG. 5 illustrates an exemplary duct wall angle in relation to a flow conditioning system of the present invention.

FIG. 5 depicts various exemplary geometries of the flow interface of a wall 280 of either a preconditioner such as preconditioners 120, 220 or a stationary flow geometry structure of a directional flow conditioner 224. This interface may have any one of a plurality of shapes and adjacent walls may have different interfaces. The interface geometry is selected so as to provide smooth entry of fluid flow directed into passageways 284. The interface geometry is dependent on the predictability of the upstream fluid flow, the velocity of the upstream fluid flow, the direction of the upstream fluid flow as it approaches the preconditioners and stationary flow geometry structures as well as the pressure of the fluid flow. In FIG. 5, a first interface geometry 290 has a pyramidal interface, forming a pyramid at a preselected angle. A second interface geometry 292 has a radiused interface, forming a rounded surface at a preselected radius. As will be appreciated by those skilled in the art, any other interface geometry may be used, such as for example a flat interface, a cone, a truncated cone, a truncated pyramid, or any similar geometry that provides smooth inlet flow may be used.

Figure 6:
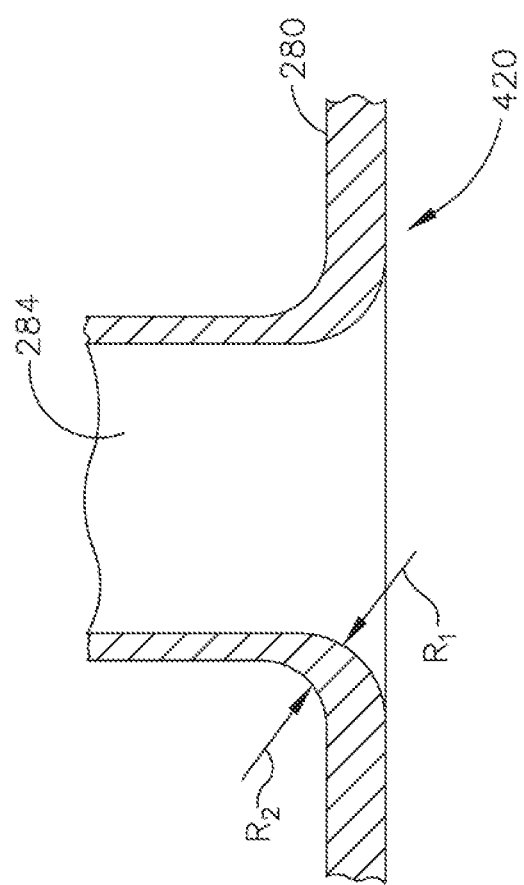
FIG. 6 is a cross section of an exemplary inlet of a low loss stationary flow geometry structure of FIG. 3, 4 or 5.

FIG. 6 is a cross section of an exemplary passageway 284 and associated walls 280 for a low loss venturi flow conditioner 420 of the present invention. This geometry is exemplary for use on both preconditioners and on stationary flow geometry structures. This is one preferred embodiment and any other embodiment that improves the predictability of downstream fluid flow or provides a substantially uniform flow profile may be used. In this embodiment, the interface geometry as described in FIG. 6 above is substantially flat. The walls forming passageway 284 have a substantially flat portion that is orthogonal to the general direction of airflow in the duct. The walls smoothly transition to a portion that is parallel to the direction of fluid flow in the duct and parallel to those of adjacent passageways 284. The walls thus transition through an angle 90°. The transition is accomplished using a preselected outer wall radius $R_1$ and a preselected inner wall radius $R_2$ so that the transition is smooth so that no turbulence occurs to airflow entering passageway 284. $R_1$ and $R_2$ may vary depending on the velocity the pressure and the amount of airflow. Of course, other geometries that deliver smooth flow into the preconditioner also may be used, FIGS. 7(a) and 7(b) depict an exemplary geometry of a flow conditioner of the present invention. FIG. 7(a) depicts a forward looking aft view of the flow conditioner, which may be either a preconditioner or a stationary flow geometry structure. The exemplary flow conditioner comprises a formed tube array 502 configured for installation inside a duct. Tube surfaces of the formed tube array form a smooth profile for fluid incident on its surface so as not to contribute to any further irregular flow patterns. In this example, the duct is circular so the tube array 502 forming the flow conditioner is also circular. The tube array may be modified to conform to the shape of the duct when the duct is not circular. The circular array of tubes 504 is held together by a plurality of brackets 506 which are attached to the tubes and to the duct. The attachments may be by any one or combination of known attachment means, such as by brazing, interference fits or mechanical attachments.

FIG. 7(b) depicts an isometric view of a portion of the forward looking aft view of FIG. 7(a), showing spacing 510 between the tubes for the passage of fluid. Spacing between the tubes in the tube array may be accomplished by spacing tubes of the same diameter at preselected distances to provide the predetermined spacing. Another convenient method of providing the predetermined spacing is by providing tubes of different preselected diameters. Placement of adjacent tubes of different diameters will provide different spacing which will result in different amounts of flow across the tube array.

As will be understood by those skilled in the art, the arrangement of tubes may extend as far across the duct cross section as is required to accomplish its purpose, although in most circumstances, either a preconditioner or stationary flow geometry structure extends completely across the duct.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A flow conditioning system for a duct, comprising:
   a preconditioner, the preconditioner providing predictable downstream flow to fluid flowing within the duct;
   a stationary flow geometry structure downstream of the preconditioner, wherein the stationary flow geometry structure further conditions fluid flow from the preconditioner, providing downstream flow with a substantially uniform flow profile; and
   wherein the flow conditioning system transforms fluid having a maldistributed flow profile upstream of the flow conditioning system to fluid having a predetermined flow profile downstream of the flow conditioning system, wherein the predetermined flow profile comprises at least one of a predetermined velocity, pressure, or direction.

2. The flow conditioning system of claim 1 wherein the preconditioner comprises
   a passageway formed by the wall, wherein at least a portion of the fluid flowing in the duct passes through the passageway as it traverses from a fore to an aft end of the duct, the passageway removing at least some of the maldistributed flow profile in fluid upstream of the preconditioner; and
   a wall extending at least partially across the duct; and
   wherein the preconditioner provides the fluid with a predictable downstream flow due to the geometry of the passageway and wall.

3. The flow conditioning system of claim 2 wherein the preconditioner is a fairing extending into the duct.

4. The flow conditioning system of claim 2 wherein the preconditioner is a venturi flow device.

5. The flow conditioning system of claim 1 wherein the stationary flow geometry structure comprises a venturi extending at least partially across the duct.

6. The flow conditioning system of claim 1 wherein the stationary flow geometry structure comprises a wall having passageways.

7. The flow conditioning system of claim 6 wherein the wall forming passageways has a smooth transition to the passageways, thereby avoiding turbulent fluid flow into the passageways.

8. The flow conditioning system of claim 1 wherein the stationary flow geometry structure comprises a tubing array extending at least partially across the duct.

9. The flow conditioning system of claim 8 wherein the tubing array comprises a plurality of tubes, each tube spaced from another by a predetermined distance, the tubing array attached to the duct.

10. The flow conditioning system of claim 9 wherein each tube of the plurality of tubes has the same outside diameter.

11. The flow conditioning system of claim 9 wherein the tubes of the plurality of tubes have different outside diameters, the spacing between the tubes of different outside diameter providing different flow distributions for fluid flowing in the duct.

12. The flow conditioning system of claim 1 wherein the predetermined flow profile directed downstream is a substantially uniform flow profile.

13. The flow conditioning system of claim 12 wherein the substantially uniform flow profile is directed downstream in a predetermined pattern from the stationary flow geometry structure corresponding to a flow requirement for a downstream component.

14. A method of removing maldistributed fluid flow profile in a duct, comprising the steps of:
    providing a flow conditioning system in the duct, the flow conditioning system further comprising
    an upstream flow preconditioner, and
    a downstream stationary flow geometry structure;
    providing maldistributed fluid flow in the duct upstream of the flow conditioning system;
    directing maldistributed fluid flow to the preconditioner, wherein the preconditioner channels the fluid flow into a passageway;
    providing fluid flow to the stationary flow geometry structure from the preconditioner, the fluid flow from the preconditioner being more predictable;
    providing fluid flow exiting the stationary flow geometry structure downstream into the duct, the fluid flow from the stationary flow geometry structure having a substantially uniform flow profile, the maldistributed flow profile having been removed by the fluid conditioning system, wherein the substantially uniform flow profile comprises at least one of a predetermined velocity, pressure, or direction.

15. The method of claim 14 wherein the step of providing a flow conditioning system in the duct further includes positioning the flow conditioning system downstream of a component or structure in the duct, wherein the component or structure in the duct contributes to maldistributed fluid flow profile.

16. The method of claim 14 wherein the step of providing a flow conditioning system in the duct further includes positioning the flow conditioning system downstream of a curvature in the duct, wherein the curvature in the duct contributes to maldistributed fluid flow profile.

17. The method of claim 14 wherein the step of providing a flow conditioning system in the duct further includes positioning the flow conditioning system upstream of a component or structure in the duct, wherein the flow conditioning system removes maldistributed fluid flow profile from the fluid flow, the stationary flow geometry structure providing the substantially uniform fluid flow to the component or structure.

18. The method of claim 14 further including a plurality of preconditioners upstream of the stationary flow geometry structure, each preconditioner of the plurality of preconditioners further adjusting fluid flow so that it is more predictable and less maldistributed so that the fluid flow exiting the stationary flow geometry structure has a uniform flow profile, the plurality of preconditioners and the stationary flow geometry structure having removed the maldistributed flow profile from the fluid.

19. The method of claim 15 wherein the step of positioning the flow conditioner downstream of a component or structure in the duct further includes positioning the preconditioner downstream and adjacent the component or structure.

20. The method of claim 17 wherein the stationary flow geometry flow structure provides preselected amounts of substantially uniform fluid flow in the predetermined direction to preselected portions of the component or structure in the duct.

\* \* \* \* \*